United States Patent [19]

Hubbard et al.

[11] Patent Number: 4,825,338
[45] Date of Patent: Apr. 25, 1989

[54] BOLT-IN CIRCUIT BREAKER WITH IMPROVED TERMINAL FASTENER RETAINER

[75] Inventors: Dean A. Hubbard, Sussex; Michael R. Larsen, Milwaukee; Donald A. Link, Hubertus, all of Wis.

[73] Assignee: Eaton Corporation, Cleveland, Ohio

[21] Appl. No.: 192,997

[22] Filed: May 12, 1988

[51] Int. Cl.⁴ .............................................. H02B 1/04
[52] U.S. Cl. .................................. 361/376; 200/51 R; 361/353
[58] Field of Search ............... 439/116, 207, 345, 366, 439/376, 212, 371; 174/68.2, 70 B, 71 B, 72 B; 361/346, 353, 355, 358, 361, 363, 376; 200/51 R

[56] References Cited

U.S. PATENT DOCUMENTS

| | | | |
|---|---|---|---|
| 3,204,150 | 8/1965 | Gauthier | 361/376 |
| 4,144,554 | 3/1979 | Erickson | 361/355 |
| 4,358,815 | 11/1982 | Koslosky et al. | 361/355 |

Primary Examiner—Gerald P. Tolin
Attorney, Agent, or Firm—L. G. Vande Zande

[57] ABSTRACT

A flat plastic retainer having a loop at one end rotatably receiving a threaded fastener and a tongue and outboard fingers unidirectionally extending from the loop to engage an essentially upright leg of a terminal of a circuit breaker, has lateral projections on the tongue which are compressed when the tongue is inserted through an opening in the leg of the terminal and expand when the projections pass beyond the opposite side of the terminal to resist pull-out of the retainer from the terminal. The outboard fingers are deflected along the terminal to bias the fastener into engagement with an associated leg of the terminal having an opening through which one portion of a threaded fastener pair projects to engage the other portion.

5 Claims, 1 Drawing Sheet

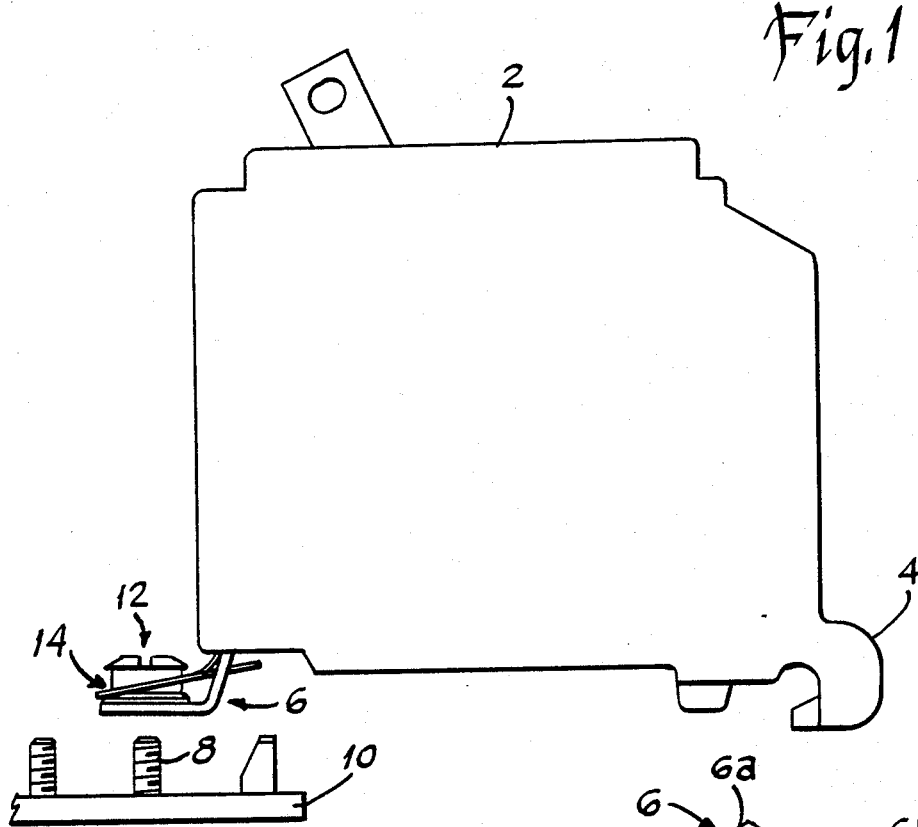
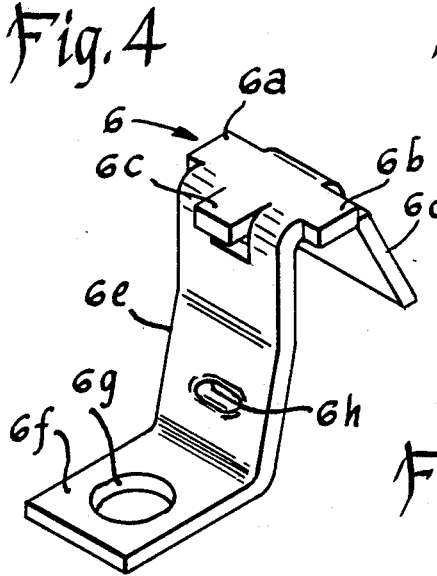
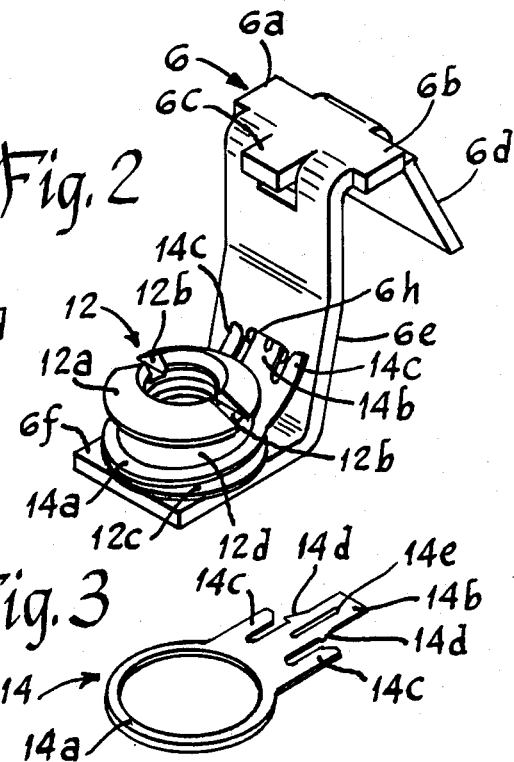

BOLT-IN CIRCUIT BREAKER WITH IMPROVED TERMINAL FASTENER RETAINER

BACKGROUND OF THE INVENTION

This invention relates to overload responsive circuit breakers which are mounted in a panelboard or load center for protecting apparatus in a branch distribution circuit. More particularly, this invention relates to circuit breakers of the aforementioned type wherein the electrical connection to the power supply of the panelboard or load center is effected by a bolt-in connection of the circuit breaker terminal to the supply bus of the panelboard or load center. Specifically, the invention is related to an improved retainer for captivating a threaded fastener element on the terminal of the circuit breaker while the circuit breaker is detached from the panelboard or load center.

It is desirable to retain the threaded fastener element of a bolt-in circuit breaker in operative position on the terminal of that device primarily for the convenience of the installer. With the fastener so retained, it will not become lost in shipping or handling of the circuit breaker. Also, the connection of the circuit breaker terminal to the panelboard or load center supply bus is located at the rear side of the breaker, substantially remote from the front surface thereof, and access to the fastener element is therefore restricted. By retaining the fastener element in operative position on the terminal, the installer can readily attach the circuit breaker to the panelboard or load center and complete the electrical connection thereof with a screwdriver or similar tool. In addition to the convenience factors, retainment of the fastener element on the circuit breaker terminal affords a safety advantage. The installer is not required to reach into a hard to access location to hold a loose fastener while attempting to engage that fastener with a tool, thereby potentially dropping the fastener to fall to an undetermined position within the panelboard apparatus wherein it could significantly reduce opposite polarity electrical spacings of that apparatus if not retrieved before power is again applied to the panelboard.

An example of bolt-in circuit breakers mounted within a panelboard is shown in U.S. Pat. No. 4,358,815 issued Nov. 9, 1982 to H. E. Koslosky et al and assigned to the assignee of this application. In that patent, a cylindrically shaped, internally threaded nut is shown retained in position on the terminal of a circuit breaker by a nylon retainer having a loop surrounding the body of the nut and a tongue tucked under an insulating sleeve which is shrink-fit over a leg of the circuit breaker terminal. Although the retainer described therein is well suited for its intended purpose, the assembly method is expensive and is not well suited for automated circuit breaker assembly. Other retainers have been attempted for use in an automated assembly circuit breaker, but for one reason or another were found to be less than well suited for the intended purpose. For example, in one embodiment a wire loop was placed around the body of the fastener, and the ends of the wire loop were brought closely together, then formed to extend parallel, substantially radially from the loop through an opening in the terminal. The distal ends of the wires were formed over to engage the rear side of the terminal to prevent withdrawal through the opening. However, this structure did not positively locate the fastener in the proper orientation on the terminal for testing purposes during assembly and did not adequately position the fastener in an operative position for installation. Another version provided a cage on the terminal member loosely captivating the threaded fastener therein, but this version added cost and significantly increased the width of the terminal assembly.

SUMMARY OF THE INVENTION

This invention provides an improved retainer for holding a threaded fastener element on a terminal of an overload responsive circuit breaker. The retainer is inexpensively and readily manufactured and installed to the terminal and firmly secures the fastener in the proper orientation on the terminal. The improved retainer of this invention comprises a flat, flexible plastic member having a loop rotatably receiving the threaded fastener therein and a tongue extending from the loop, the tongue having lateral projections which are compressed as the tongue is inserted through an opening formed in the terminal. Lateral, or outboard, fingers are provided on the retainer to extend unidirectionally with the tongue, the fingers being deflected along the terminal when the tongue is inserted through the terminal opening to bias the loop toward the leg of the terminal against which the fastener element is positioned. The tongue is provided with a longitudinal slot in the general area of the lateral projections to facilitate compression as the projections pass through the opening in the terminal and to be accessible to a hook during assembly to assist in moving the projections through the opening whereupon they expand to resist withdrawal of the tongue from the opening. When so inserted, the tongue is readily movable within the opening to permit limited longitudinal movement of the retainer with respect to the terminal to facilitate alignment of the retained fastener element with the cooperable fastening element of the panelboard or load center. The fingers, on the other hand, provide a firm bias to the retainer to substantially prevent any lateral motion of the fastener element on the terminal.

This invention, its features and advantages, will become more apparent when reading the following description and claims in conjunction with the accompanying drawings.

BRIEF DESCRIPTION OF THE DRAWINGS

FIG. 1 is a side elevational view of an overload responsive circuit breaker positioned adjacent a branch circuit conductor to which it is to be bolt-in connected;

FIG. 2 is an isometric view of the terminal, fastener element and retainer assembly of this invention;

FIG. 3 is an isometric view of the retainer of this invention; and

FIG. 4 is an isometric view of the terminal of the circuit breaker of FIG. 1.

DESCRIPTION OF THE PREFERRED EMBODIMENT

A molded case, overload responsive circuit breaker 2 is shown in side elevation in FIG. 1. Circuit breaker 2 has a hook 4 formed at its lower right-hand corner (as oriented in the drawing) for attachment in a well known manner to a suitably formed ledge or rail (not shown) within a panelboard or load center. The lower left-hand corner of circuit breaker 2 is provided with a terminal 6 which is more clearly shown in FIG. 4. Terminal 6 has a particularly structured upper end which includes mounting and positioning tabs 6a, 6b and 6c and an angularly depending wing 6d to which a stationary contact for the circuit breaker may be affixed. The particular shape of the terminal as it exists within the housing of the circuit breaker 2 is not significant to this invention. The pertinent portions of terminal 6 are the angularly depending leg 6e and the horizontal leg 6f extending therefrom. Leg 6f is provided with an aperture 6g which is oversize with respect to the threaded post 8 of panelboard conductor 10 to which terminal 6 is to be connected. Aperture 6g is also slightly oblong in the longitudinal direction of leg 6f to accommodate some misalignment of the post 8 with the aperture 6g. The essentially upright leg 6e is provided with a rectangular, horizontally oriented opening 6h. The edges of opening 6h on the near surface, i.e. the surface adjacent leg 6f, are beveled or radiused to increase the size of the opening at the near surface.

A cylindrical, internally threaded nut 12 is provided to be mutually threadably engagable with the post 8 for clamping the terminal leg 6f to the surface of branch circuit conductor 10 when the nut 12 is threaded tightly upon the post 8. As seen in FIGS. 1 and 2, nut 12 has a beveled upper head portion 12a in which a screwdriver slot 12b is formed. Nut 12 also has a flanged lower end 12c. The body portion 12d between head portion 12a and flanged lower portion 12c is recessed from the diameters of portions 12a and 12c to form essentially a wide annular groove or recess therebetween.

The retainer of this invention for retaining nut 12 positioned on leg 6f of terminal 6 is shown separately in flexible material such as nylon or the like having a continuous closed loop 14a formed at one end thereof. Extending away from the loop 14a is a central tongue 14b and a pair of lateral or outboard fingers 14c. Tongue 14b has a pair of swept back winged projections 14d formed on the lateral edges thereof intermediate the base of the tongue and the distal end thereof. Tongue 14b extends beyond the projections 14d and beyond the distal ends of fingers 14c. A longitudinally extending slot 14e is formed in the center of tongue 14b extending from a point on the loop side of projections 14d to a point near the distal end of tongue 14b.

In assembly, the loop 14a of retainer 14 is positioned over the enlarged beveled head portion 12a of nut 12. The resiliency of retainer 14, the shape of head 12a and the screwdriver slots 12b combine to permit the assembly of loop 14a over the head portion 12a. Tongue 14b is then inserted into opening 6h in leg 6e of terminal 6 from the near surface thereof in a manner such that the distal ends of fingers 14c are directed upwardly (away from leg 6f) along the near surface of leg 6e. The enlarged opening area of opening 6h permits the tongue 14b to be readily pressed through the opening. However, to further facilitate assembly, a hook or similar tool may be utilized to engage the distal end of slot 14e at the rear surface of leg 6e to pull the tongue and projections 14d through the opening 6h, thereby compressing the projections 14d and the center portion of tongue 14b in the area of slot 14e. When projections 14d clear the rear surface of leg 6e, the projections and tongue expand and due to the orientation of the projections 14d, significantly resist any pull-out of tongue 14b from opening 6h. Fingers 14c, being deflected along leg 6e, urge the free end of loop 14a downwardly toward the upper surface of leg 6f. Loop 14a in turn bears upon the flanged lower end 12c of nut 12 and biases the nut firmly into engagement with the surface of leg 6f. The bias provided by fingers 14c is sufficiently firm to keep the nut 12 properly positioned laterally on the leg 6f. However, the tongue 14b is freely slidable within the opening 6h up to the limits of projections 14c to afford nut 12 limited movement in the longitudinal direction of leg 6f for self alignment with the mutually engagable threaded fastener such as post 8 of branch circuit conductor 10.

The retainer 14 and its various features in cooperation with the opening 6h of terminal 6 provide an assembly which is readily usable in an automated assembly apparatus for a circuit breaker. The retainer 14 holds fastener element 12 firmly in place on the terminal in its proper orientation and relationship thereto, even during automatic feeding within the automated assembly apparatus such as by a vibratory bowl or the like. The firmness of this retention is also significant in automated calibration of the circuit breaker wherein an electrode is brought squarely down upon the top surface of fastener element 12. If the fastener element 12 is out of position, the electrode will not engage properly, thereby failing to electrically clamp the terminal assembly. Although the retainer provides for more firm and secure positioning and orientation of the fastener member during automated assembly, it also provides a more flexible positioning of the fastener during installation of the circuit breaker to a panelboard or load center due to the permissible sliding movement of tongue 14b within opening 6h of the terminal. Although the foregoing has described a particular preferred embodiment of an improved retainer for a threaded fastener of a terminal of a bolt-in circuit breaker assembly, it is to be understood that it is susceptible of various modifications without departing from the scope of the appended claims.

We claim:

1. In an overload responsive circuit breaker having a terminal adapted for bolted connection to an electric conductor, said terminal having first and second legs joined at substantially a right angle and an aperture in said second leg, a planar flexible retainer attached at one end thereof to said first leg and having a continuous loop on a free end thereof received in an annular groove of a threaded fastener, said retainer positioning said fastener on said second leg in registry with said aperture for cooperable engagement with mutually threaded means of said conductor, the improvement comprising providing an opening in said first leg and means on said one end of said retainer affording press-in attachment to said first leg, said means comprising a central tongue and lateral fingers extending unidirectionally from said loop, and lateral projections on said tongue which are compressed upon insertion of said tongue through said opening and which expand after said insertion to resist withdrawal of said tongue from said opening, said fingers being deflected along said first leg away from said second leg, thereby biasing said loop toward said second leg.

2. The improvement defined in claim 1 wherein said tongue is freely slidable within said opening, after said lateral projections have passed through said opening, to permit limited movement of said fastener longitudinally along said second leg.

3. The improvement defined in claim 1 wherein bias provided by said deflected fingers centers said fastener laterally on said second leg over said aperture and effectively prevents movement of said fastener laterally along said second leg.

4. The improvement defined in claim 1 wherein said tongue comprises a slot extending longitudinally of said tongue and disposed between said lateral projections.

5. The improvement defined in claim 4 wherein said tongue and said slot extend sufficiently beyond said lateral projections to render said slot accessible to a hook when said tongue is inserted into said opening and said lateral projections abut said opening prior to compression thereof for assisting said insertion by pulling said tongue through said opening with said hook.

* * * * *